(12) United States Patent
Wang

(10) Patent No.: US 7,389,793 B2
(45) Date of Patent: Jun. 24, 2008

(54) FAUCET DEVICE SELECTIVELY OPERATABLE MANUALLY OR AUTOMATICALLY

(76) Inventor: Hsiang Hung Wang, No. 15, Puwei Lane, Lugang Town, Changhua Hsien 50564 (TW)

( * ) Notice: Subject to any disclaimer, the term of this patent is extended or adjusted under 35 U.S.C. 154(b) by 241 days.

(21) Appl. No.: 11/476,970

(22) Filed: Jun. 27, 2006

(65) Prior Publication Data

US 2007/0295417 A1    Dec. 27, 2007

(51) Int. Cl.
*F16K 11/24* (2006.01)
(52) U.S. Cl. .............. 137/599.03; 137/597; 137/599.08; 137/607
(58) Field of Classification Search ................. 137/597, 137/607, 599.03, 599.08; 251/129.04
See application file for complete search history.

(56) References Cited

U.S. PATENT DOCUMENTS

| | | | | |
|---|---|---|---|---|
| 3,623,510 A | * | 11/1971 | Hare et al. ................. | 137/607 |
| 4,709,728 A | * | 12/1987 | Ying-Chung ............ | 137/599.03 |
| 5,167,255 A | * | 12/1992 | Gohring et al. ............. | 137/607 |
| 5,725,010 A | | 3/1998 | Marty et al. ................. | 137/100 |
| 5,771,923 A | | 6/1998 | Paterson et al. ........... | 137/513.5 |
| 6,176,250 B1 | | 1/2001 | Lin et al. ...................... | 137/98 |
| 6,883,541 B2 | * | 4/2005 | Hwang ................... | 137/599.08 |
| 7,014,166 B1 | * | 3/2006 | Wang ..................... | 251/129.04 |

* cited by examiner

*Primary Examiner*—Stephen M Hepperle
(74) *Attorney, Agent, or Firm*—Charles E. Baxley

(57) ABSTRACT

A faucet device includes a block disposed in a faucet member and having two passages for receiving hot and cold water and having an entrance and an exit coupled to a solenoid valve, a housing disposed in the faucet member and having two ports aligned with the entrance and the exit of the block and an outlet for supplying the water out of the faucet member. A controlling device may control the water to selectively flow through the ports of the housing to allow the faucet device to be selectively operated either manually or automatically. A valve shank may control the hot water and the cold water to flow through the passages and to be mixed in the block.

15 Claims, 8 Drawing Sheets

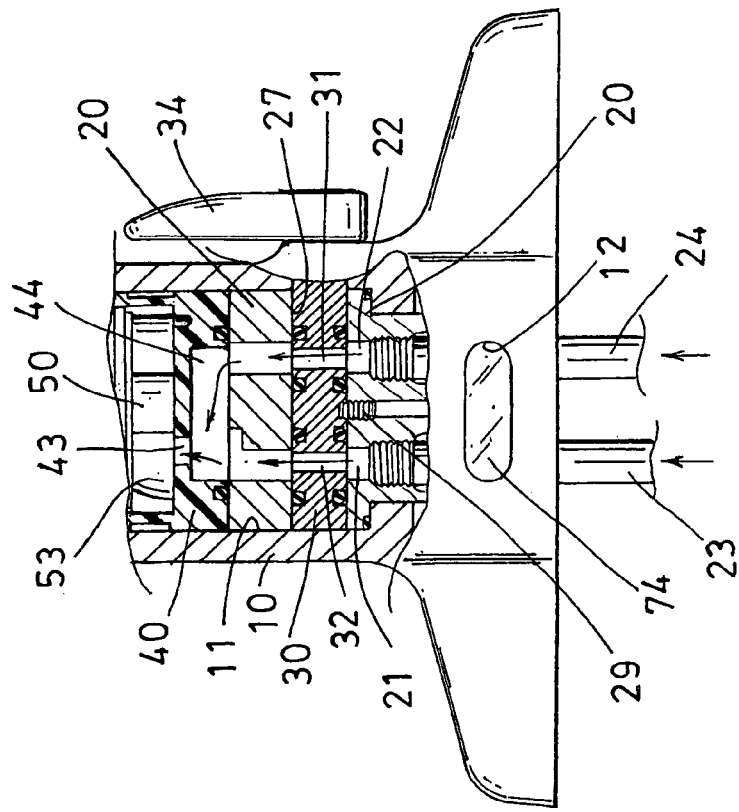
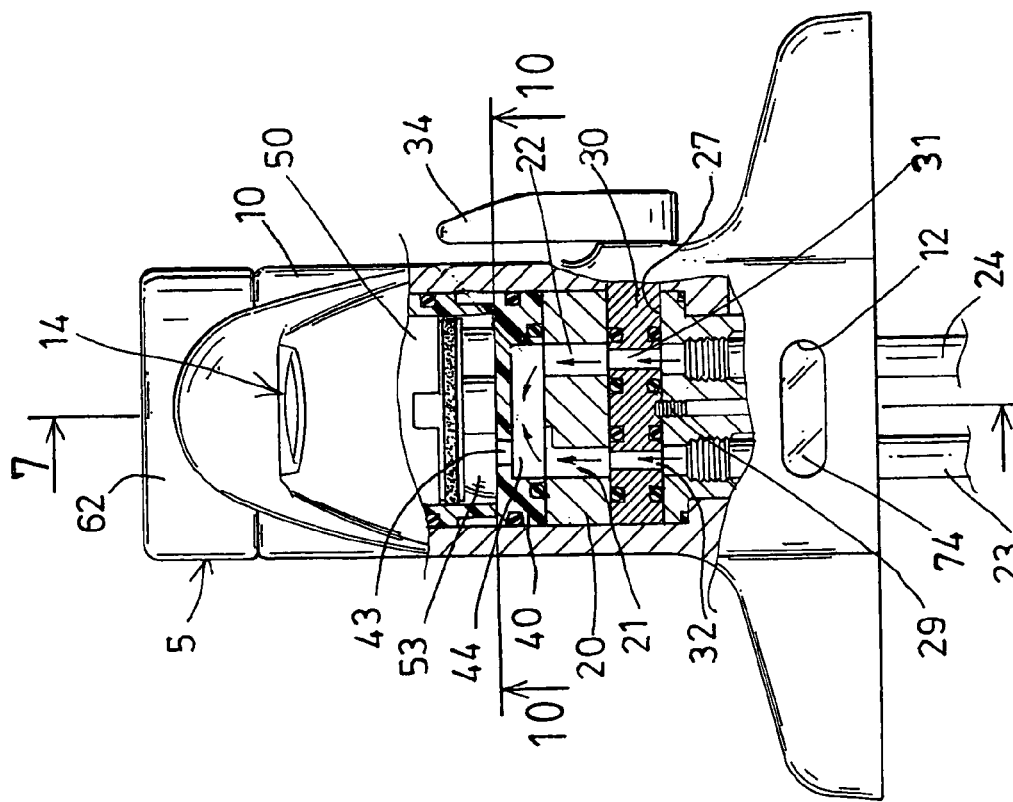

FAUCET DEVICE SELECTIVELY OPERATABLE MANUALLY OR AUTOMATICALLY

BACKGROUND OF THE INVENTION

1. Field of the Invention

The present invention relates to a faucet device, and more particularly to a faucet device including a structure for allowing hot water and cold water to be suitably or adjustably mixed with each other, and for allowing the faucet device to be selectively operated either manually or automatically.

2. Description of the Prior Art

Typical faucet devices normally comprise a hot water inlet and a cold water inlet for receiving hot water and cold water respectively and for allowing the hot water and the cold water to be suitably or adjustably mixed with each other, and for allowing an outlet water of a suitable temperature to flow out of or to be supplied out through the faucet device.

For example, U.S. Pat. No. 5,725,010 to Marty et al. and U.S. Pat. No. 6,176,250 to Lin et al. disclose two of the typical faucet devices provided for suitably or adjustably mixing the hot water and the cold water with each other, and for supplying an outlet water having a suitable mixing temperature out through the faucet device. However, the typical mixing faucet devices may only be operated or actuated manually, but may not be operated or actuated automatically.

U.S. Pat. No. 5,771,923 to Paterson et al. disclose another typical faucet device operatable or actuatable automatically with an electrically operated or actuated solenoid valve. However, the typical mixing faucet device may only be operated or actuated automatically, but may not be selectively or changeably operated or actuated manually.

The present invention has arisen to mitigate and/or obviate the afore-described disadvantages of the conventional control structures for the faucet devices.

SUMMARY OF THE INVENTION

The primary objective of the present invention is to provide a faucet device including a structure for allowing hot water and cold water to be suitably or adjustably mixed with each other, and for allowing the faucet device to be selectively operated either manually or automatically.

In accordance with one aspect of the invention, there is provided a faucet device comprising a faucet member including a chamber formed therein and including a mouth formed therein and communicating with the chamber thereof for supplying water out of the faucet member, a block disposed in the chamber of the faucet member and including two passages formed therein for coupling to and for receiving hot water and cold water respectively, the block including an entrance and an exit formed therein and offset from the passages thereof, a solenoid valve coupled between the exit and the entrance of the block, a sensor electrically coupled to the solenoid valve for detecting and for selectively actuating the solenoid valve when a user goes close to the faucet member, a housing disposed in the chamber of the faucet member and including a first port and a second port formed therein and aligned with the entrance and the exit of the block respectively, and including an outlet formed therein and communicating with the mouth of the faucet member, and a controlling device for controlling the water to selectively flow through the first port and the second port of the housing.

The housing includes a space formed therein and communicating with the first port and the second port of the housing, the controlling device includes a casing disposed in the space of the housing and having two ducts coupled to the first port and the second port of the housing respectively.

The casing includes at least one key extended therefrom for engaging with the housing and for anchoring the casing to the housing and for preventing the casing from being rotated relative to the housing and the faucet member.

The casing includes a vent formed therein and communicating with the space and the outlet of the housing, a stationary valve member is disposed in the casing and includes two grooves formed therein and coupled to the ducts of the casing respectively and includes a pathway formed therein and coupled to the vent of the casing, and a rotary valve member is rotatably disposed in the casing and rotatable relative to the casing and the stationary valve member to selectively block the grooves of the stationary valve member.

The rotary valve member includes a depression formed therein and aligned with the pathway of the stationary valve member and rotatable to selectively align with either of the grooves of the stationary valve member.

A stem is rotatably disposed in the casing and coupled to the rotary valve member, and a knob is coupled to the stem for rotating the rotary valve member relative to the stationary valve member and the casing. A valve shank is engaged into the block for controlling the hot water and the cold water to flow through the passages of the block respectively.

The block includes a channel laterally formed therein and communicating with the passages thereof, and the valve shank includes two apertures formed therein for adjustably coupling to and communicating with the passages of the block respectively.

The valve shank includes an oblong hole formed therein, and a fastener is engaged with the block and engaged into the oblong hole of the valve shank for limiting the valve shank to rotate relative to the block and the faucet member. The faucet member includes an orifice formed therein and communicating with the chamber thereof for rotatably receiving the valve shank.

The housing includes a compartment formed therein and communicating with the second port and the passages of the block for allowing the hot water and the cold water to be mixed in the compartment of the housing. The housing includes a peripheral recess formed therein for receiving a sealing ring which separates the first port from the second port and the compartment of the housing.

The faucet member includes an opening formed therein for receiving the sensor. A valve element is coupled between the exit of the block and the solenoid valve to control the water to flow from the exit of the block to the solenoid valve. The housing includes at least one anchoring member for engaging with the block for anchoring the housing to the block and the faucet member.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 5 is a partial cross sectional view of the faucet device taken along lines 5-5 of FIG. 7;

FIG. 6 is a partial cross sectional view similar to FIG. 5, illustrating the operation of the faucet device;

DETAILED DESCRIPTION OF THE PREFERRED EMBODIMENT

Figure 1:
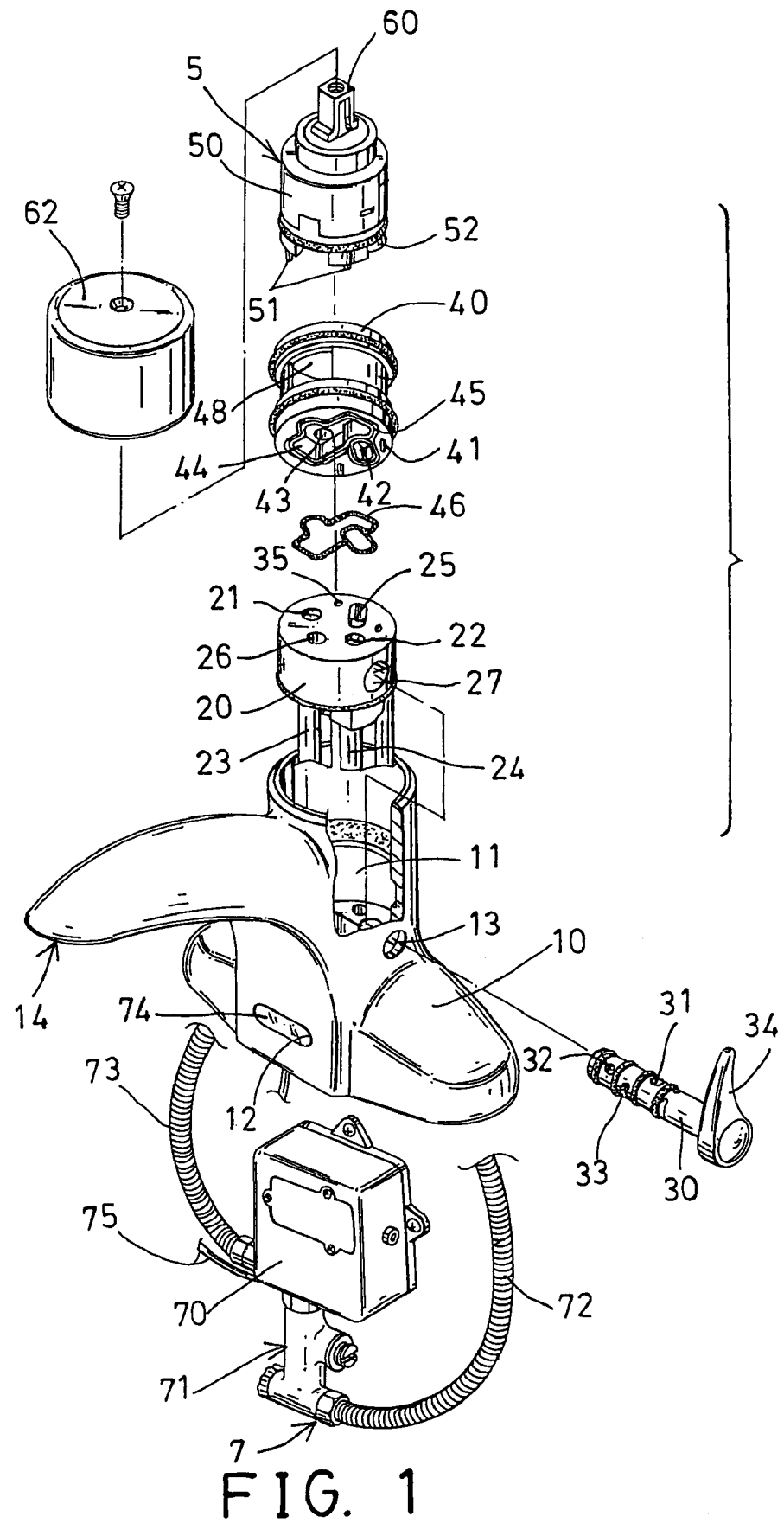
FIG. 1 is a partial exploded view of a faucet device in accordance with the present invention.
Figure 2:
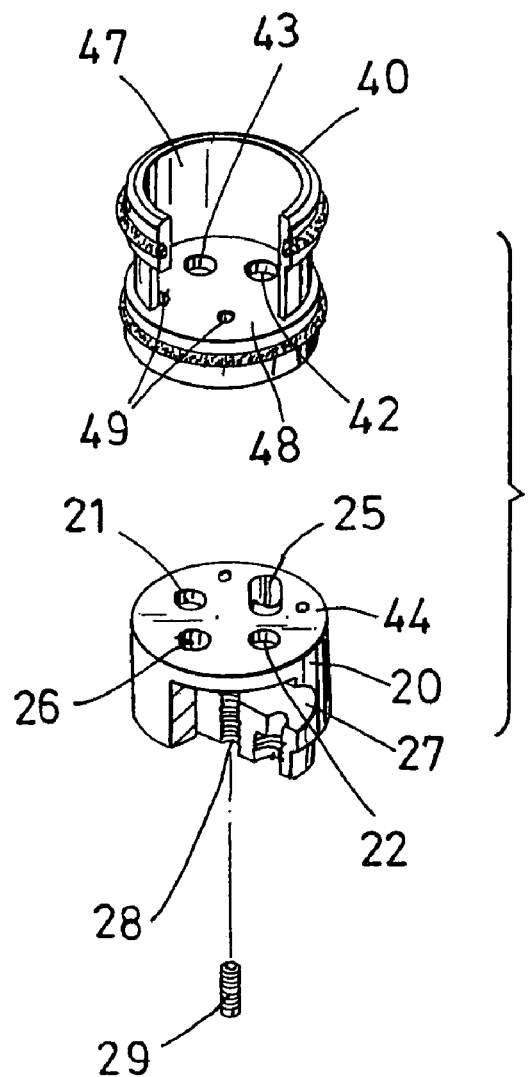
FIG. 2 is another partial exploded view of the faucet device.
Figure 3:
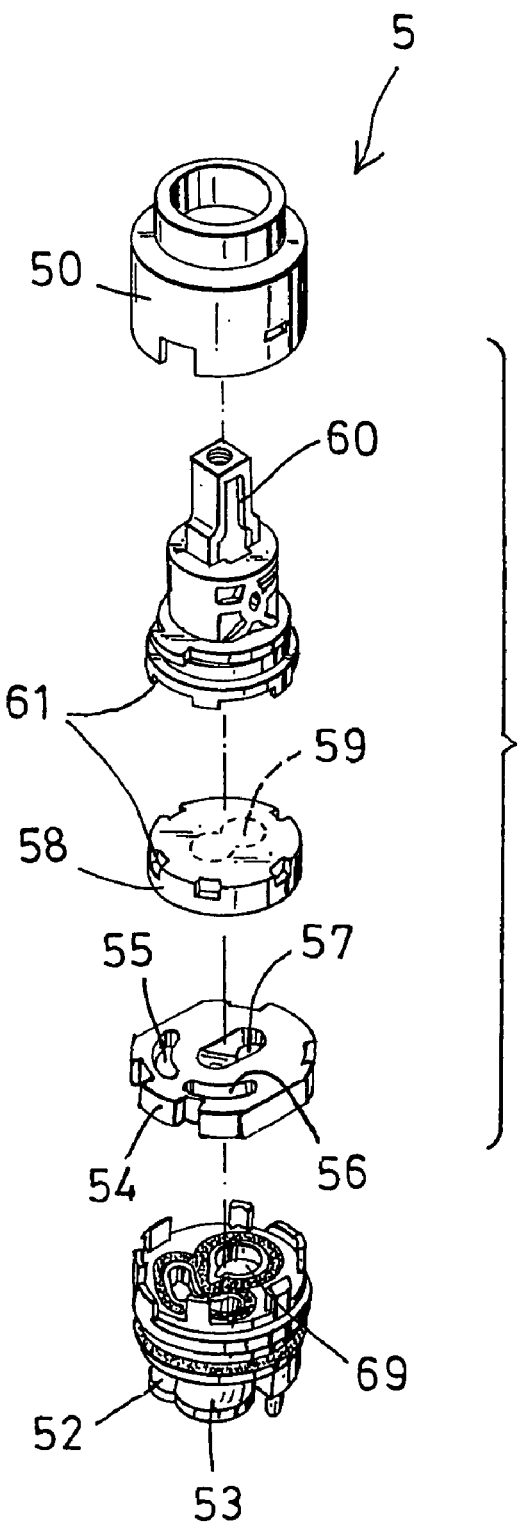
FIG. 3 is a further partial exploded view of the faucet device.
Figure 4:
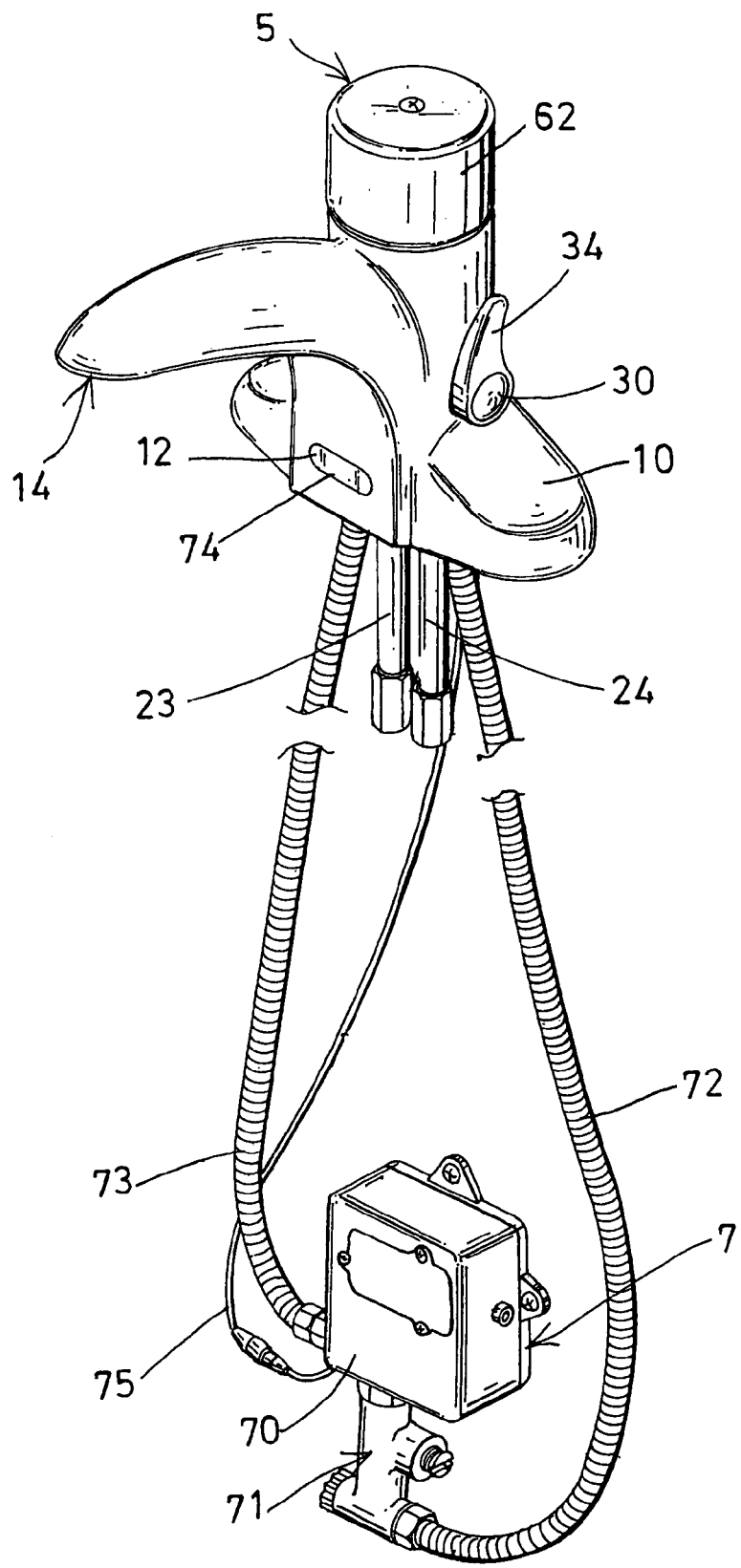
FIG. 4 is a partial perspective view of the faucet device.

Referring to the drawings, and initially to FIGS. 1-5 and 7, a faucet device in accordance with the present invention comprises a faucet body or member 10 including a chamber 11 formed therein, and including an opening 12 formed therein, such as formed in the front portion thereof, and including an orifice 13 formed therein, such as formed in the side portion thereof, and communicating with the chamber 11 thereof, and including a mouth 14 formed therein and communicating with the chamber 11 thereof for supplying water out of the faucet member 10.

Figure 14:
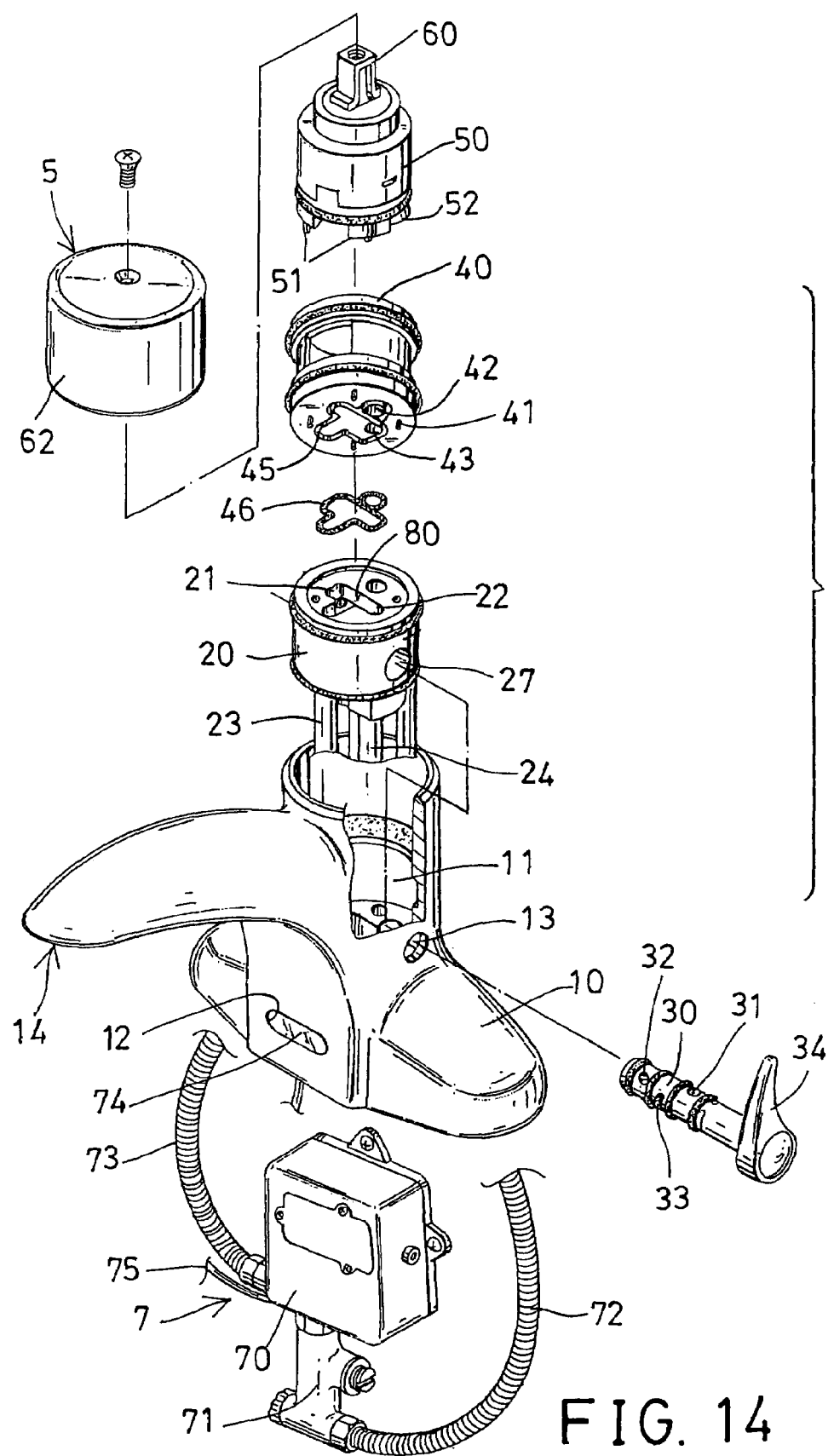
FIG. 14 is a further partial exploded view illustrating the other arrangement of the faucet device.

A block 20 is disposed or engaged into the chamber 11 of the faucet member 10 and includes two passages 21, 22 formed therein for coupling to water reservoirs with two pipes 23, 24 respectively (FIGS. 5, 6) and for receiving hot water and cold water respectively. As shown in FIG. 14, an enlarged chamber 80 may further be formed in the upper portion of the block 20 for communicating the passages 21, 22 of the block 20 with each other for allowing the hot water and the cold water to be selectively mixed in the chamber 80 of the block 20. As shown in FIGS. 1-2 and 7-8, the block 20 may further include an entrance 25 and an exit 26 formed therein and offset from the passages 21, 22 thereof, and includes a channel 27 laterally formed therein and intersecting or communicating with the passages 21, 22 thereof, and includes a screw hole 28 formed therein, such as formed in the bottom portion thereof for engaging or threading with a fastener or peg or limiting member 29.

A valve shank 30 is rotatably engaged through the orifice 13 of the faucet member 10 and engaged into the lateral channel 27 of the block 20 for stably retaining the block 20 within the chamber 11 of the faucet member 10, and includes two apertures 31, 32 formed therein for selectively or adjustably coupling to or communicating with the passages 21, 22 of the block 20 respectively and for controlling or adjusting the hot water and the cold water to flow through the passages 21, 22 of the block 20 respectively, and includes an oblong hole 33 formed therein, and includes a handle 34 attached thereto or formed thereon for rotating the valve shank 30 relative to the block 20 and the faucet member 10.

Figure 7:
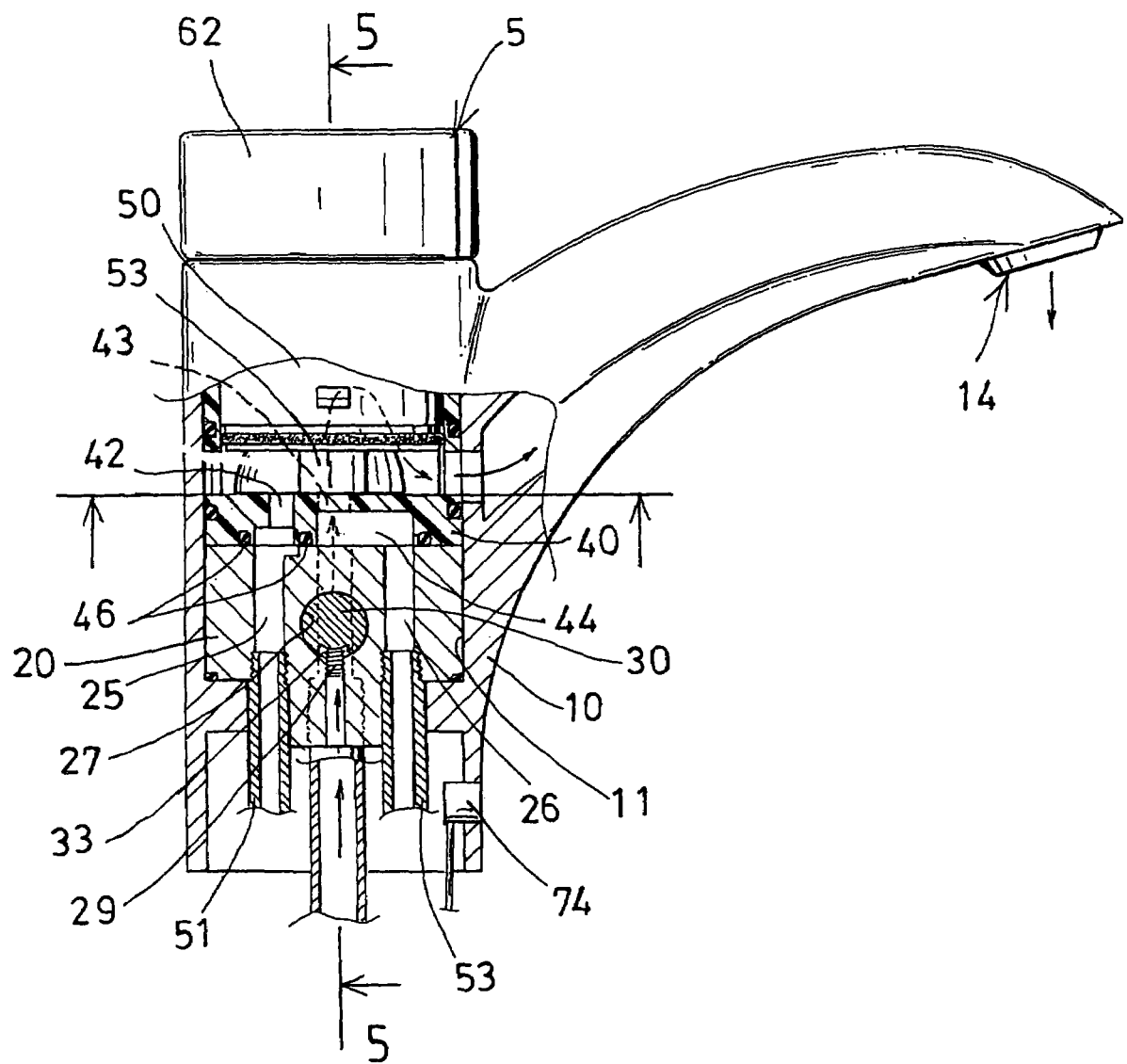
FIG. 7 is a partial cross sectional view of the faucet device taken along lines 7-7 of FIG. 5.
Figure 8:
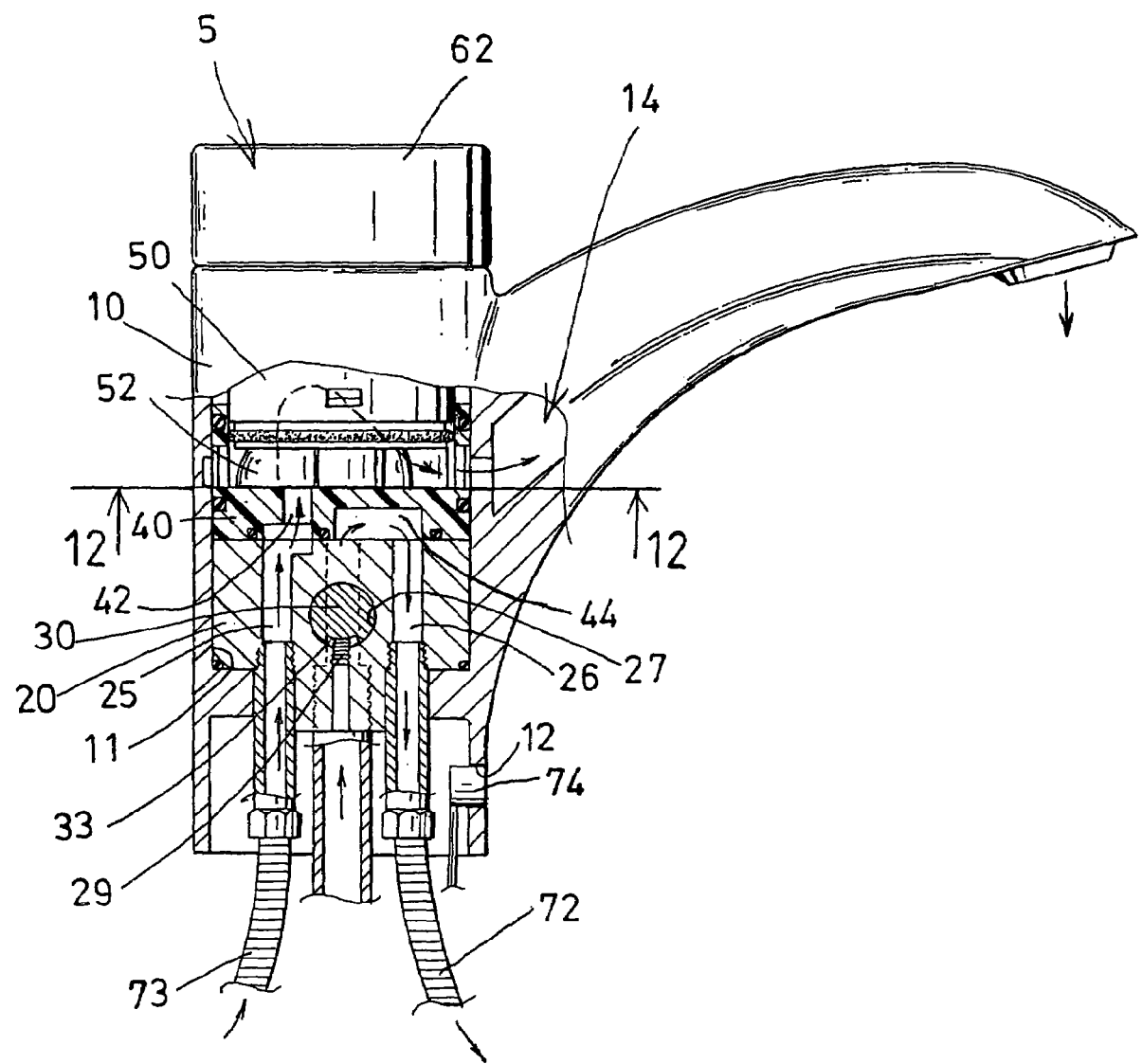
FIG. 8 is a partial cross sectional view similar to FIG. 7, illustrating the operation of the faucet device.
Figure 9:
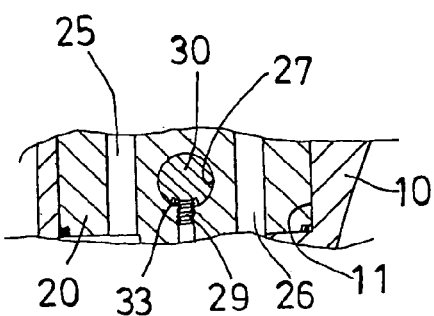
FIG. 9 is an enlarged partial cross sectional view illustrating the operation of the faucet device.

As shown in FIGS. 7-9, the fastener or peg or limiting member 29 is engaged into the oblong hole 33 of the valve shank 30 for limiting the valve shank 30 to rotate relative to the block 20 and the faucet member 10 and also for controlling the engagement or the relative position between the apertures 31, 32 of the valve shank 30 and the passages 21, 22 of the block 20 respectively and thus for allowing the flowing of the hot water and the cold water through the passages 21, 22 of the block 20 to be suitably controlled or adjusted, and thus for allowing the valve shank 30 of the faucet device to be easily operated by the users.

A housing 40 is also disposed or engaged into the chamber 11 of the faucet member 10 and includes one or more cavities or projections or anchoring members 41 extended therefrom for engaging into the corresponding projections or cavities or anchoring members 35 of the block 20 for anchoring or positioning the housing 40 to the block 20 and the faucet member 10 and for preventing the housing 40 from being rotated relative to the block 20 and the faucet member 10. The housing 40 includes two ports 42, 43 formed therein and aligned with the entrance 25 and the exit 26 of the block 20 respectively, and includes a compartment 44 formed therein and communicating with one of the ports 43 (FIG. 1) and the passages 21, 22 of the block 20 for allowing the hot water and the cold water to be mixed in the compartment 44 of the housing 40 (FIGS. 5, 6) or to be mixed in the chamber 11 of the faucet member 10.

The housing 40 further includes a peripheral recess 45 formed therein, such as formed in the bottom portion thereof, for receiving a sealing ring 46 which may separate or space the port 42 from the other port 43 and the compartment 44 of the housing 40, and includes a space 47 formed therein (FIG. 2) and communicating with the ports 42, 43 of the housing 40, and includes an outlet 48 and one or more holes or anchoring members 49 formed therein and communicating with the space 47 of the housing 40, and arranged for allowing the mixed water to flow out through the mouth 14 of the faucet member 10 via the space 47 and the outlet 48 of the housing 40.

A control means or device 5 includes a casing 50 disposed in the space 47 of the housing 40 and having one or more keys 51 extended therefrom for engaging into the holes or anchoring members 49 of the housing 40 and for anchoring or positioning the casing 50 of the control device 5 to the housing 40 and for preventing the casing 50 from being rotated relative to the housing 40 and the faucet member 10. The casing 50 includes two ducts 52, 53 formed or provided therein and aligned with and coupled to the ports 42, 43 of the housing 40 respectively (FIGS. 5-8) for allowing the mixed water to flow between the ducts 52, 53 of the casing 50 and the ports 42, 43 of the housing 40 respectively. The casing 50 further includes a vent 69 (FIG. 3) formed therein and communicating with the space 47 and the outlet 48 of the housing 40.

A stationary valve plate or member 54 is disposed or secured in the casing 50 and includes two grooves 55, 56 formed or provided therein and aligned with and coupled to the ducts 52, 53 of the casing 50 respectively for allowing the mixed water to flow between the ducts 52, 53 of the casing 50 and the grooves 55, 56 of the stationary valve member 54 respectively, and includes a pathway 57 formed or provided therein and aligned with and coupled to the vent 69 of the casing 50 for allowing the mixed water to flow between the vent 69 of the casing 50 and the pathway 57 of the stationary valve member 54.

A rotatable or rotary valve plate or member 58 is rotatably disposed in the casing 50 and rotatable relative to the casing 50 and the stationary valve member 54, and includes a depression 59 formed or provided therein and aligned with the pathway 57 of the stationary valve member 54, and the rotary valve member 58 is rotatable to selectively align the depression 59 thereof with either of the grooves 55, 56 of the stationary valve member 54. A stem 60 may be rotatably disposed in the casing 50 and engaged with or coupled to the rotary valve member 58, and a knob 62 may be coupled to the stem 60 for rotating the rotary valve member 58 relative to the stationary valve member 54 and the casing 50 to selectively block the grooves 55, 56 of the stationary valve member 54.

Figure 10:
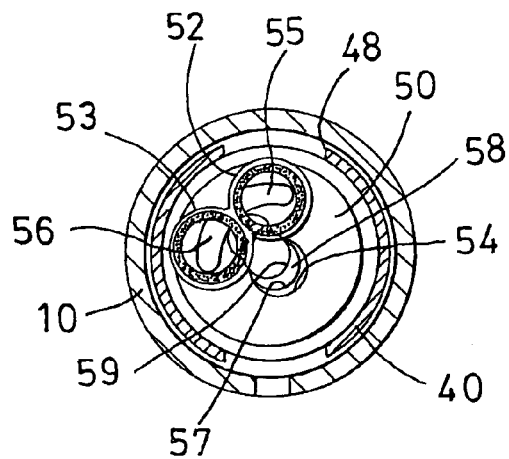
FIG. 10 is a cross sectional view of the faucet device taken along lines 10-10 of FIG. 5.

In operation, as shown in FIG. 10, when the rotary valve member 58 is rotated relative to the stationary valve member 54 and the casing 50 to disengage or offset the depression 59 thereof from the grooves 55, 56 of the stationary valve member 54, the grooves 55, 56 of the stationary valve member 54 and thus the ducts 52, 53 of the casing 50 may be blocked by the rotary valve member 58 (FIG. 5) such that the hot water and the cold water may flow into and may be mixed within the compartment 44 of the housing 40 (FIG. 5), but may not flow out through the mouth 14 of the faucet member 10 at this moment.

Figure 11:
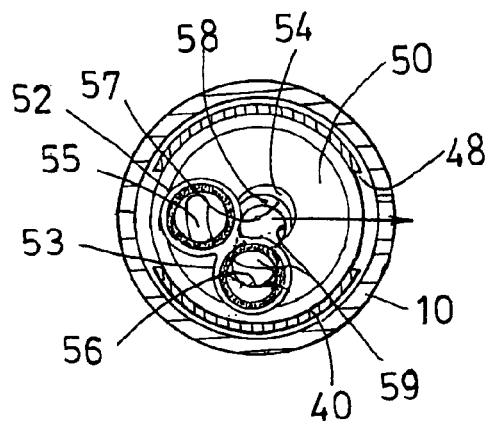
FIG. 11 is a cross sectional view of the faucet device taken along lines 11-11 of FIG. 7.

As shown in FIGS. 6, 7 and 11, when the rotary valve member 58 is further rotated relative to the stationary valve member 54 and the casing 50 to align the depression 59 thereof with one of the grooves 56 of the stationary valve member 54, the mixed water in the compartment 44 of the housing 40 may flow through the port 43 of the housing 40 and into the duct 53 of the casing 50, and then into the groove 56 of the stationary valve member 54, and then into the depression 59 of the rotary valve member 58, and then into the pathway 57 of the stationary valve member 54, and then into the vent 69 of the casing 50 for allowing the mixed water to flow out through the space 47 and the outlet 48 of the housing 40 and then to flow out through the mouth 14 of the faucet member 10.

Figure 12:
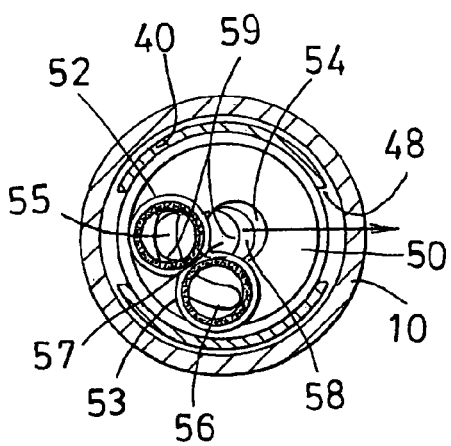
FIG. 12 is a cross sectional view of the faucet device taken along lines 12-12 of FIG. 8.

As shown in FIGS. 8 and 12, when the rotary valve member 58 is further rotated relative to the stationary valve member 54 and the casing 50 to align the depression 59 thereof with the other groove 55 of the stationary valve member 54, the groove 56 of the stationary valve member 54 may be blocked by the rotary valve member 58, and the mixed water in the compartment 44 of the housing 40 may flow into the exit 26 of the block 20 (FIG. 8) which will then be coupled to an actuating means or device 7 in order to control or to actuate the mixed water to flow out through the space 47 and the outlet 48 of the housing 40 and then to flow out through the mouth 14 of the faucet member 10 automatically.

Figure 13:
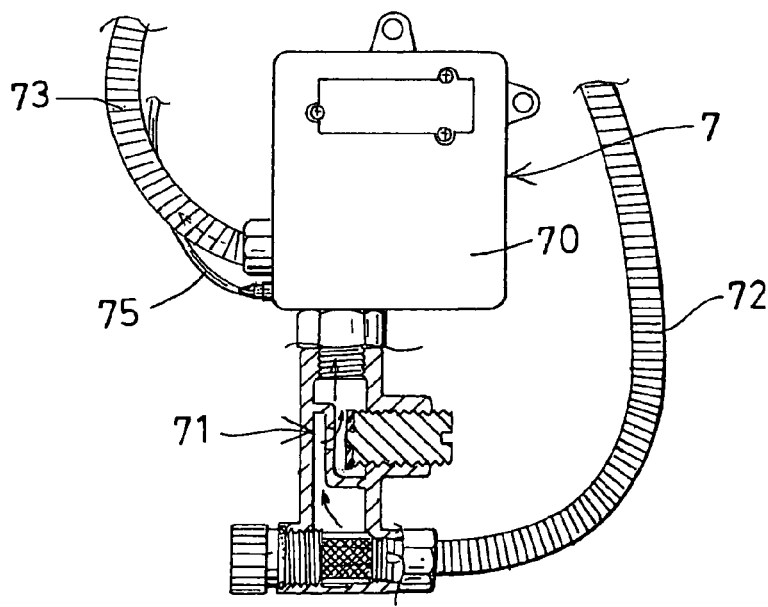
FIG. 13 is another partial cross sectional view of the faucet device.

For example, the actuating means or device 7 includes a typical solenoid valve 70 coupled to the exit 26 of the block 20 with a valve element 71 and a hose 72 (FIG. 13), and includes another hose 73 coupled to the entrance 25 of the block 20 such that the solenoid valve 70 may be coupled between the exit 26 and the entrance 25 of the block 20. The valve element 71 is disposed or coupled between the exit 26 of the block 20 and the solenoid valve 70, and may control or turn on and off the mixed water to flow from the exit 26 of the block 20 to the solenoid valve 70, and the solenoid valve 70 may thus control or turn on and off the mixed water to flow from the solenoid valve 70 to the entrance 25 of the block 20, and then to flow into the port 42 of the housing 40 and the duct 52 of the casing 50, and then to flow into the groove 55 of the stationary valve member 54, and then into the depression 59 of the rotary valve member 58. The valve element 71 may turn off the water from the hose 72 to the solenoid valve 70 when it is required to remove or to install the solenoid valve 70.

The mixed water flowing into the depression 59 of the rotary valve member 58 may then flow into the pathway 57 of the stationary valve member 54, and then into the vent 69 of the casing 50 for allowing the mixed water to flow out through the space 47 and the outlet 48 of the housing 40 and then to flow out through the mouth 14 of the faucet member 10. The actuating means or device 7 further includes a detector or sensor 74 disposed or engaged in the opening 12 of the faucet member 10 and electrically coupled to the solenoid valve 70 with electrical wires or cables 75 for detecting whether a user is going close to the faucet member 10 or not and for selectively actuating or operating the solenoid valve 70 to control or to turn on and off the mixed water to flow from the solenoid valve 70 to the entrance 25 of the block 20.

In operation, as shown in FIGS. 5 and 10, the rotary valve member 58 may be rotated relative to the stationary valve member 54 by the knob 62 to offset or to disengage the depression 59 of the rotary valve member 58 from the grooves 55, 56 of the stationary valve member 54 and to block the grooves 55, 56 of the stationary valve member 54 and thus to turn or shut off the water, such that the faucet device is enabled or turned off at this time. As shown in FIGS. 6, 7 and 11, the rotary valve member 58 may be rotated to selectively align the depression 59 thereof with one of the grooves 56 of the stationary valve member 54 and to allow the mixed water to flow out through the space 47 and the outlet 48 of the housing 40 and then to flow out through the mouth 14 of the faucet member 10, such that the faucet device may be operated manually.

As shown in FIGS. 8 and 12, the rotary valve member 58 may also be rotated relative to the stationary valve member 54 and the casing 50 by the knob 62 to align the depression 59 thereof with the other groove 55 of the stationary valve member 54, and to allow the mixed water in the compartment 44 of the housing 40 to flow into the exit 26 of the block 20 and then to flow to the solenoid valve 70 and thus to allow the mixed water to be selectively or changeably operated or actuated or controlled automatically by the solenoid valve 70 of the actuating means or device 7, and the solenoid valve 70 may be controlled or actuated by the detector or sensor 74 to control the mixed water to flow out through the space 47 and the outlet 48 of the housing 40 and then to flow out through the mouth 14 of the faucet member 10. The housing 40 and/or the casing 50 and the stationary valve member 54 and the rotary valve member 58 may thus be formed or acted as the controlling means or device 5 for controlling the water to selectively flow through the ports 42, 43 of the housing 40.

Accordingly, the faucet device in accordance with the present invention includes a structure for allowing hot water and cold water to be suitably or adjustably mixed with each other, and for allowing the faucet device to be selectively operated either manually or automatically.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A faucet device comprising:
   a faucet member including a chamber formed therein and including a mouth formed therein and communicating with said chamber thereof for supplying water out of said faucet member,
   a block disposed in said chamber of said faucet member and including two passages formed therein for coupling to and for receiving hot water and cold water respectively, said block including an entrance and an exit formed therein and offset from said passages thereof,
   a solenoid valve coupled between said exit and said entrance of said block, a sensor electrically coupled to said solenoid valve for detecting and for selectively actuating said solenoid valve when a user goes close to said faucet member, a housing disposed in said chamber of said faucet member and including a first port and a second port formed therein and aligned with said entrance and said exit of said block respectively, and including an outlet formed therein and communicating with said mouth of said faucet member, and means for controlling the water to selectively flow through said first port and said second port of said housing.

2. The faucet device as claimed in claim 1, wherein said housing includes a space formed therein and communicating with said first port and said second port of said housing, said controlling means includes a casing disposed in said space of said housing and having two ducts coupled to said first port and said second port of said housing respectively.

3. The faucet device as claimed in claim 2, wherein said casing includes at least one key extended therefrom for engaging with said housing and for anchoring said casing to said housing and for preventing said casing from being rotated relative to said housing and said faucet member.

4. The faucet device as claimed in claim 2, wherein said casing includes a vent formed therein and communicating with said space and said outlet of said housing, a stationary valve member is disposed in said casing and includes two grooves formed therein and coupled to said ducts of said casing respectively and includes a pathway formed therein and coupled to said vent of said casing, and a rotary valve member is rotatably disposed in said casing and rotatable relative to said casing and said stationary valve member to selectively block said grooves of said stationary valve member.

5. The faucet device as claimed in claim 4, wherein said rotary valve member includes a depression formed therein and aligned with said pathway of said stationary valve member and rotatable to selectively align with either of said grooves of said stationary valve member.

6. The faucet device as claimed in claim 5, wherein a stem is rotatably disposed in said casing and coupled to said rotary valve member, and a knob coupled to said stem for rotating said rotary valve member relative to said stationary valve member and said casing.

7. The faucet device as claimed in claim 1, wherein a valve shank is engaged into said block for controlling the hot water and the cold water to flow through said passages of said block respectively.

8. The faucet device as claimed in claim 7, wherein said block includes a channel laterally formed therein and communicating with said passages thereof, and said valve shank includes two apertures formed therein for adjustably coupling to and communicating with said passages of said block respectively.

9. The faucet device as claimed in claim 7, wherein said valve shank includes an oblong hole formed therein, and a fastener is engaged with said block and engaged into said oblong hole of said valve shank for limiting said valve shank to rotate relative to said block and said faucet member.

10. The faucet device as claimed in claim 7, wherein said faucet member includes an orifice formed therein and communicating with said chamber thereof for rotatably receiving said valve shank.

11. The faucet device as claimed in claim 1, wherein said housing includes a compartment formed therein and communicating with said second port and said passages of said block for allowing the hot water and the cold water to be mixed in said compartment of said housing.

12. The faucet device as claimed in claim 11, wherein said housing includes a peripheral recess formed therein for receiving a sealing ring which separates said first port from said second port and said compartment of said housing.

13. The faucet device as claimed in claim 1, wherein said faucet member includes an opening formed therein for receiving said sensor.

14. The faucet device as claimed in claim 1, wherein a valve element is coupled between said exit of said block and said solenoid valve to control the water to flow from said exit of said block to said solenoid valve.

15. The faucet device as claimed in claim 1, wherein said housing includes at least one anchoring member for engaging with said block for anchoring said housing to said block and said faucet member.

* * * * *